US010002061B2

(12) United States Patent
Chen et al.

(10) Patent No.: US 10,002,061 B2
(45) Date of Patent: Jun. 19, 2018

(54) USB INTERFACE DETECTOR (71) Applicant: Fairchild Semiconductor Corporation, Phoenix, AZ (US)

(72) Inventors: Jianli Chen, Beijing (CN); Weiming Sun, Beijing (CN); Emma Wang, Beijing (CN); Lei Huang, Beijing (CN)

(73) Assignee: Fairchild Semiconductor Corporation, Sunnyvale, CA (US)

( * ) Notice: Subject to any disclaimer, the term of this patent is extended or adjusted under 35 U.S.C. 154(b) by 0 days. days.

(21) Appl. No.: 15/160,085

(22) Filed: May 20, 2016

(65) Prior Publication Data
US 2016/0342492 A1 Nov. 24, 2016

(30) Foreign Application Priority Data

May 22, 2015 (CN) .......................... 2015 1 0271372

(51) Int. Cl.
G06F 11/22 (2006.01)
G06F 11/30 (2006.01)
G06F 13/38 (2006.01)
G06F 13/42 (2006.01)
G06F 1/32 (2006.01)

(52) U.S. Cl.
CPC ........ *G06F 11/2247* (2013.01); *G06F 1/3215* (2013.01); *G06F 11/3027* (2013.01); *G06F 11/3051* (2013.01); *G06F 13/385* (2013.01); *G06F 13/4282* (2013.01)

(58) Field of Classification Search
CPC ............. G06F 11/2247; G06F 11/3051; G06F 11/3055; G06F 11/385
See application file for complete search history.

(56) References Cited

U.S. PATENT DOCUMENTS

| 2009/0198841 | A1* | 8/2009 | Yoshida | G06F 13/4295 710/16 |
| 2014/0013012 | A1* | 1/2014 | Terlizzi | G06F 13/38 710/15 |
| 2016/0116928 | A1* | 4/2016 | Motoki | G05F 1/575 323/280 |
| 2016/0179648 | A1* | 6/2016 | Srivastava | G06F 11/3051 710/16 |
| 2016/0188514 | A1* | 6/2016 | Forghani-Zadeh | G06F 13/385 710/313 |

OTHER PUBLICATIONS

USB 3.0 Promoter Group; "USB Type-C Cable and Connector Specification"; Aug. 11, 2014.*

* cited by examiner

*Primary Examiner* — Tim T Vo
*Assistant Examiner* — Phong H Dang
(74) *Attorney, Agent, or Firm* — Brake Hughes Bellermann LLP (57) ABSTRACT

Systems and methods are disclosed, including a USB interface detector, a detection method, a USB connector, and an electronic device. The detection method may be applicable to the USB connector mounted in the electronic device. According to an operation mode of the electronic device, a first pin and a second pin in the USB interface can be pulled up or pulled down. After the pull up or the pull down, a voltage change at the first and second pins are detected. If the voltage changes cross a reference voltage, an instruction related to attachment or detachment with a second device can be provided.

17 Claims, 7 Drawing Sheets

302 — Pull up or pull down a first pin and a second pin in a USB connector according to an operation mode of a first device 304 — Detect whether voltages at the first and second pins have a change of crossing a reference voltage 306 — Provide an instruction related to attachment/detachment with a second device when the change is detected

USB INTERFACE DETECTOR

CLAIM OF PRIORITY

This application claims the benefit of priority under 35 U.S.C. § 119(a) of Jianli Chen et al. CN Application No. 201510271372.2, filed on May 22, 2015, which is hereby incorporated by reference in its entirety.

BACKGROUND

Universal serial bus (USB) connectors have been widely applied in electronic devices, including power adapters, mobile power sources, notebook computers, mobile phones, or tablet computers, to implement various functions, such as charging and data transmission. USB connectors have evolved over time to include, in addition to traditional Type-A and Type-B connectors, a Type-C USB connector meeting the USB 3.1 protocol. Type-C USB connectors have, among other things, a higher data rate and a higher configurable charging current than traditional connectors, as well as a configuration that supports the same type of connector at each end of a cable, and is symmetrical, top-to-bottom, such that, no matter how you align a Type-C USB plug at a socket, the socket will receive the plug.

OVERVIEW

This document discusses, among other things, a detector and a detection method used for a USB interface, which can perform an attachment/detachment detection of a USB interface by using two CC pins of the USB interface. The detector is applicable to a USB connector mounted in a master-slave system, and the method to a USB connector mounted in a first device.

The detector is applicable to a USB connector mounted in a first device, and comprises: a first detection terminal and a second detection terminal, respectively connected to a first pin and a second pin of the USB connector; a terminating circuit, configured to pull up or pull down the first and second detection terminals; a comparator circuit, comprising a first comparator and a second comparator, and configured to: detect whether voltages at the first and second pins have a change of crossing a reference voltage after the pull-up or pull-down, and provide an instruction in response to the change being detected; and an output terminal, configured to output the instruction.

The method is applicable to a USB connector mounted in a first device, and comprises: pulling up or pulling down a first pin and a second pin in the USB connector according to an operation mode of the electronic device; detecting whether voltages at the first and second pins have a change of crossing a reference voltage after the pull-up or pull-down; and providing an instruction related to attachment/detachment with a second device when the change is detected.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The Type-C USB socket interface includes two configuration channel (CC) pins configured to assist a downstream facing port (DFP) to an upstream facing port (UFP) attachment/detachment detection, a USB plug orientation detection, an initial DFP-to-UFP (master-slave) relationship detection, a current detection of a USB Type-C VBUS pin, and the like.

However, currently, there is no effective solution for performing an attachment/detachment detection of a USB interface by using two CC pins.

In the following text, exemplary embodiments are described briefly. As may be known by persons skilled in the art, the described embodiments may be modified in various manners without departing from the spirit or scope of the present invention. Therefore, the accompanying drawings and descriptions are considered exemplary instead of limitative in essence.

To facilitate understanding technical solutions of the present invention, in the following text, technical terms used in the present invention are explained.

A Downstream Facing Port (DFP) device may be understood as a Host. A typical DFP device is a power adapter because it always only supplies power.

An Upstream Facing Port (UFP) device may be understood as a Device, and typical UFP devices are a USB flash drive and a mobile hard disk because they are always read/written for data and are always powered.

A Dual Role Port (DRP) device may dynamically switch between a DFP device and a UFP device, and can serve as a DFP device (Host) or a UFP device (Device). Typical DRP devices include a computer (which may be used as a Host of the USB flash drive, and may also be served as a UFP device being charged), a mobile phone having an on-the-go (OTG) function (which may be used as a device being charged and being read/written for data, and may also be used as a Host to provide power source for other devices or read/write data from/into a USB flash drive), and a mobile power source (which may be discharged and charged by using a single USB Type-C interface).

A debug accessory mode is a special USB interface attachment mode when an electronic device is operated as a DFP device, and generally, device manufacturers attach debug accessories to USB interfaces of electronic devices before the electronic devices leave the factory, thereby debugging the electronic devices.

An audio adapter accessory mode is a special USB interface attachment mode when an electronic device is operated as a DFP device. This is a mode reserved for function extension of a USB connector.

Figure 1A:
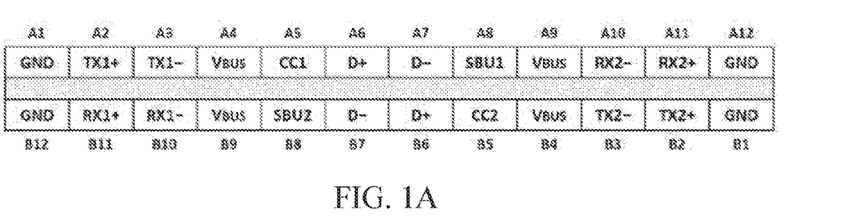
FIG. 1A illustrates an example schematic diagram of a USB Type-C socket.
Figure 1B:
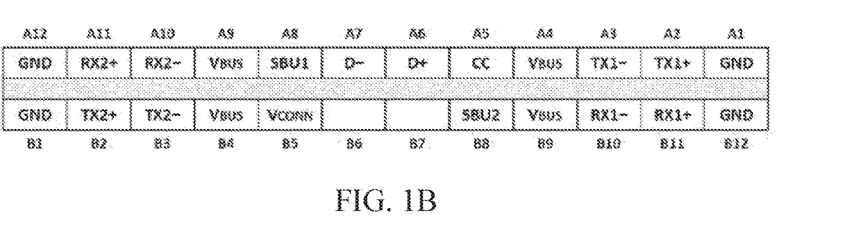
FIG. 1B illustrates an example schematic diagram of a USB Type-C plug.

FIG. 1A illustrates an example schematic diagram of a function signal pin of an interface of a USB Type-C socket, and FIG. 1B illustrates an example schematic diagram of a function signal pin of an interface of a USB Type-C plug.

As shown in FIG. 1a and FIG. 1b, an interface of a USB Type-C socket comprises two CC pins, that is, a CC1 pin and a CC2 pin, a USB Type-C cable used to connect a Host (a DFP device) and a Device (a UFP device) comprises one CC signal line, and an interface of a USB Type-C plug merely one CC pin.

In order to detect states of the Host (DFP) and the Device (UFP), in an initial time, the CC1 pin and the CC2 pin of the Host are pulled to a power source voltage by a pull-up current, and the Device is pulled down to a ground voltage by a pull-down resistor Rd. When the DFP detects that a voltage at the CC1 or CC2 terminal is between Vref2 and Vref3, it indicates that the UFP has been attached to the DFP. In this case, the DFP provides VBUS to the UFP, and after the UFP detects the VBUS voltage, the UFP may detect a state of connecting to the DFP. Then, the UFP confirms, by detecting a voltage range of the CC1 and CC2 terminals, a charging current provided by the Host to the Device.

Moreover, two special terminations on the visible CC pin of the DFP are defined for a direct-attachment accessory mode: Ra/Ra directed to the audio adapter accessory mode and Rd/Rd directed to the debug accessory mode.

TABLE 1

Port state from the perspective of DFP

| CC1 | CC2 | State | Orientation |
|---|---|---|---|
| Open | Open | No attachment | N/A |
| Rd | Open | UFP attachment | 1 |
| Open | Rd | | 2 |
| Open | Ra | Charged cable/no UFP attachment | 1 |
| Ra | Open | | 2 |
| Rd | Ra | Charged cable/UFP attachment | 1 |
| Ra | Rd | | 2 |
| Rd | Rd | Debug accessory attachment | N/A |
| Ra | Ra | Audio adapter accessory attachment | N/A |

The USB interface detectors according to the embodiments of the present invention may be applied to a DFP device, a UFP device, and a DRP device (which is operated as a DFP device when being attached to a UFP device, and can be operated as a UFP device when being attached to a DFP device).

When a device having the USB interface detector is operated as a DFP device, the USB interface detector can pull up two pins (e.g., pulls up by using a pull-up current source) and uses at least two comparators (e.g., four comparators, etc.). The comparators can detect whether a voltage of at least one of the two pins is dropped to be lower than an unterminated voltage, so as to determine whether the USB interface is attached. When it is determined that the USB interface is attached, a voltage interval of the dropped voltage can be further detected, so as to determine whether the attachment is a UFP attachment and an orientation of the attachment, and optionally, to determine whether the attachment is an audio adapter accessory attachment or a debug accessory attachment.

When a device having the USB interface detector is operated as a UFP device, the USB interface detector can provide a pull-down resistor for two pins, and can use at least two comparators (e.g., four comparators, etc.) for detection. The comparators can detect whether a voltage at one of the two pins is lifted to be higher than an unterminated voltage thereof, so as to determine whether a DFP attachment exists and determine an orientation of the attachment. When it is determined that the DFP attachment exists, the magnitude of the pull-up current provided by the DFP device can be further detected, thereby determining the magnitude of a charging current provided by the DFP device through VBUS.

In the following text, a USB interface detector and a detection method according to exemplary embodiments are described with reference to the accompanying drawings. In the specification, the detector and the detection method proposed in the present invention are described with reference to a USB Type-C interface; however, persons skilled in the art may know that the detector and the detection method according to the present invention is not limited to the scenario of the USB Type-C, but is applicable to any future USB connector compatible to a USB Type-C connector.

Figure 2:
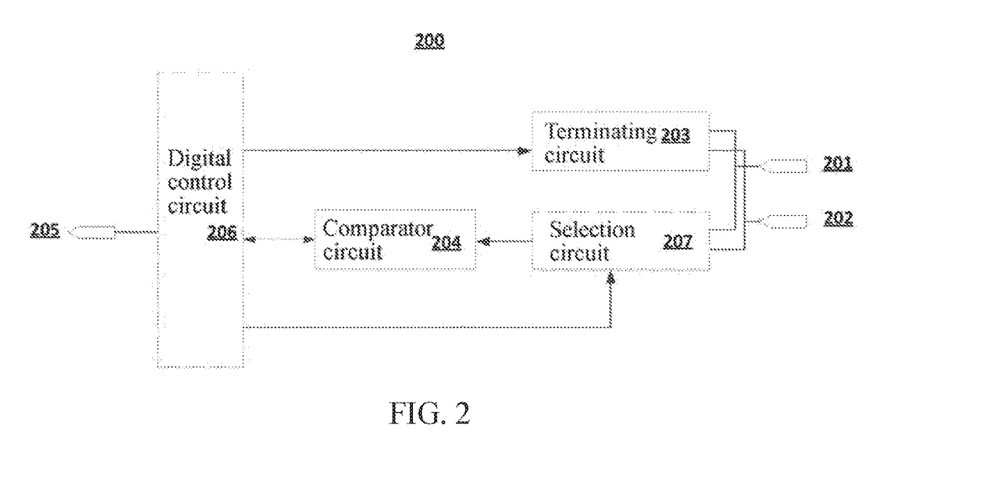
FIG. 2 illustrates an example schematic block diagram of a USB interface detector.

FIG. 2 illustrates an example schematic block diagram of a USB interface detector 200 applicable to a USB connector mounted in a first device, including a first detection terminal 201 and a second detection terminal 202, respectively connected to a first signal pin CC1 and a second signal pin CC2 of the USB connector. The USB interface detector 200 can include a terminating circuit 203 configured to pull up or pull down the first and second detection terminals 201 and 202, a comparator circuit 204 comprising first and second comparators (not shown) configured to detect whether voltages at the first and second pins have a change of crossing a reference voltage after the pull-up or pull-down and to provide an instruction indicating attachment/detachment with a second device in response to the change being detected, and an output terminal 205 configured to output the instruction.

In an example, the terminating circuit 203 is configured to respectively provide a pull-up current source (or a pull-up resistor) for the first and second detection terminals when the first device is operated as a DFP device, and when the first device is operated as a UFP device, respectively connect the first and second detection terminals to a pull-down resistor.

The USB interface detector 200 can include a digital control circuit 206 configured to control the terminating circuit 203 to pull up or pull down the first and second pins according to an operation mode (DFP or UFP) of the first device, to provide an enable signal to the comparator circuit 204, and to set the magnitude of a reference voltage of the comparator circuit 204.

The comparator circuit 204 can include third and fourth comparators (not shown) respectively configured to compare a voltage of the first or second detection terminal with the set reference voltage. The comparator circuit 204 can provide an instruction related to a type of the second device or an instruction related to the magnitude of a charging current provided by the second device according to comparison results of the four comparators.

The USB interface detector 200 can include a selection circuit 207 connected between the digital control circuit 206 and the comparator circuit 204 configured to connect at least one of the first and second detection terminals 201, 202 to the comparator circuit 204 according to a selection signal provided by the digital control circuit.

In an example, an integrated circuit can include one or more of the components of the USB interface detector 200.

Figure 3:
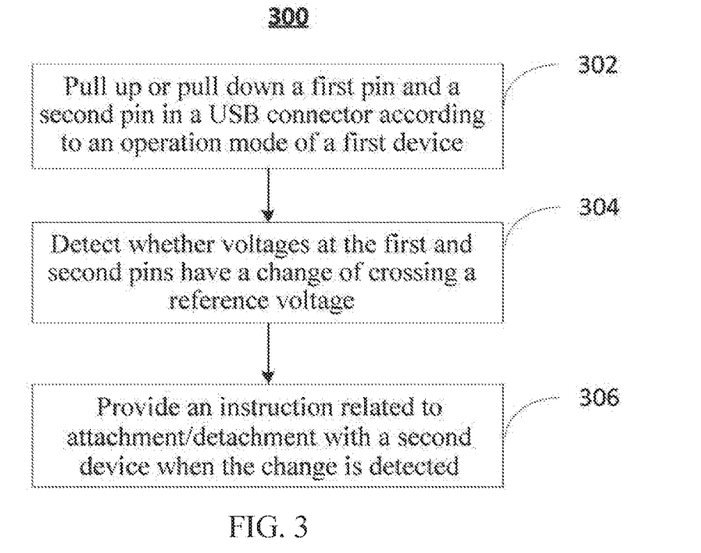
FIG. 3 illustrates an example flow diagram of a USB interface detection method.

FIG. 3 illustrates an example flow diagram of a USB interface detection method 300 using the USB interface detector 200 illustrated in FIG. 2. The detection method 300 may comprise the following steps:

In step 302, a first pin and a second pin in the USB connector can be pulled up or pulled down according to an operation mode of a first device. In step 304, the method can detect whether voltages at the first and second pins have a change of crossing a reference voltage after the pull-up or pull-down. In step 306, an instruction related to attachment/detachment with a second device is provided when the change is detected.

In an example, when the first device is operated as a DFP device, for example, voltages at the first and second pins can be pulled up by using a pull-up current source to be higher than a first reference voltage, and after the pull-up, the obtained voltage is an unterminated voltage of the DFP. The voltages at the first and second pins can be respectively compared with the first reference voltage, so as to detect whether the voltage of at least one of the first and second pins is dropped to be lower than the first reference voltage, and when the drop is detected, it indicates that there is a pull-down resistor connected to the first or second pin, thereby providing an instruction related to interface attachment.

In an example, when the first device is operated as a DFP device, after the interface attachment is detected, the process can proceed to a state in which interface detachment is detected. Specifically, it may be detected whether the voltage at the first or second pin is lifted to be higher than the first reference voltage, and when the lift is detected, an instruction related to interface detachment is provided.

In an example, when the first device is operated as a UFP device, for example, the voltages at the first and second pins can be pulled down by using a pull-down resistor to be lower than a fourth reference voltage, and after the pull-down, the obtained voltage is an unterminated voltage of the UFP. The voltages at the first and second pins can be respectively compared with the fourth reference voltage, so as to detect whether the voltage of at least one of the first and second pins is lifted to be higher than the fourth reference voltage, and when the lift is detected, it indicates that there is a pull-down current connected to the first or second pin, thereby providing an instruction related to interface attachment.

In an example, when the first device is operated as a UFP device, after the interface attachment is detected, the process can proceed to a state in which interface detachment is detected. Specifically, it may be detected whether the voltage at the first or second pin is dropped to be lower than the first reference voltage, and when the drop is detected, an instruction related to interface detachment can be provided.

Figure 4:
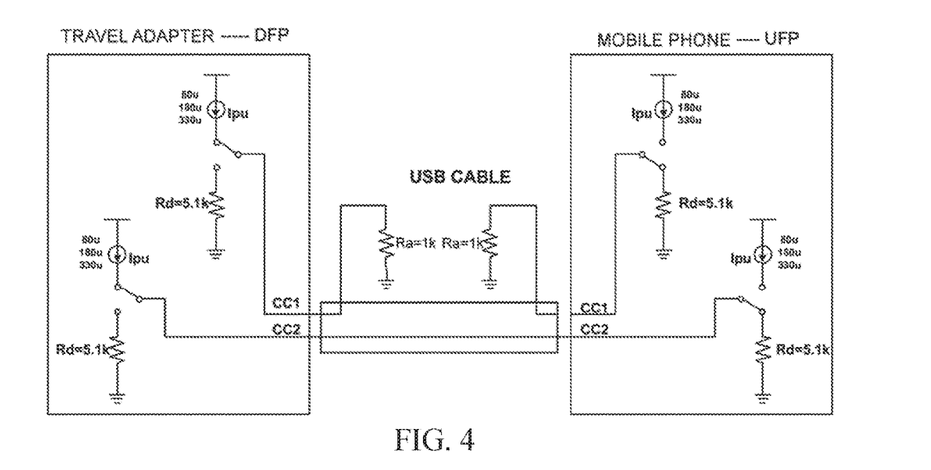
FIG. 4 illustrates an example schematic diagram of a USB interface detector system.

FIG. 4 illustrates an example schematic diagram of a USB interface detector system in an example application scenario in which a travel charger is used to charge a mobile phone, where the USB interface detector is implemented as a chip, and a USB socket and a corresponding USB interface detection chip are respectively disposed in the travel charger and the mobile phone. Each USB socket has a CC1 pin and a CC2 pin. The USB interface detection chip comprises a pull-up current source, a pull-down resistor and a single-pole double-throw switch for each of the CC1 pin and the CC2 pin.

In this application scenario, the travel adapter is operated as a DFP, and the mobile phone is operated as a UFP. Therefore, a USB interface detection chip in the travel adapter is set to a DFP mode, and a USB interface detection chip in the mobile phone is set to a UFP mode. An operation mode of the USB interface detection chip may be set by a device manufacturer (for example, a manufacturer manufacturing travel adapters or a manufacturer manufacturing mobile phones).

In this case, the USB interface detection chip at the travel adapter side is configured to connect two pull-up current sources to the CC1 pin and the CC2 pin through switches, so as to pull up voltages of the CC1 pin and the CC2 pin in the USB socket at the travel adapter side. In an example, the magnitudes of currents provided by the two pull-up current sources depend on a charging current that can be provided by the travel adapter. It is assumed that a nominal value of the charging current of the USB power source comprises 900 mA, 1.5 A and 3 A, magnitudes of corresponding pull-up currents are respectively 80 uA, 180 uA and 330 uA.

The USB interface detection chip at the mobile phone side is configured to connect the CC1 pin and the CC2 pin to a pull-down resistor through switches, so as to pull down voltages of the CC1 pin and the CC2 pin in the USB socket at the mobile phone side. In an embodiment, a value of the pull-down resistor is 5.1 k$\Omega$.

The USB socket in the travel charger and the USB socket in the mobile phone are connected through a USB cable and USB plugs at two ends of the USB cable. As described above, the USB plug has merely one CC pin, and when the CC pins in the two USB plugs are respectively connected to the CC2 pin in the USB socket of the travel charger and the CC2 pin in the USB socket of the mobile phone, a connection state currently shown in FIG. 4 is formed, that is, the CC2 pin in the USB socket of the travel charger and the CC2 pin in the USB socket of the mobile phone are connected through the USB cable.

When the travel charger is connected to the mobile phone, a path is formed from the pull-up current source of the travel charger directed to the CC2 pin to the pull-down resistor of the mobile phone directed to the CC2 pin, so as to pull the CC2 pin of the travel charger and the CC2 pin of the mobile phone to a certain voltage, and a value of the voltage equals to the current value provided by the current source multiplied by the resistance value of the pull-down resistor. From the perspective of the travel charger (DFP), the CC2 pin is pulled down; the USB interface detection chip in the travel charger is operated in the DFP mode, and accordingly the CC2 pin is pulled down in a certain voltage range, it is detected that a current state of the USB socket is UFP attached and an attachment orientation corresponds to the CC2 pin. From the perspective of the mobile phone (UFP), the CC2 pin is pulled up; the USB interface detection chip in the mobile phone is operated in the UFP mode, and accordingly the CC2 pin is pulled up in a certain voltage range, it is detected that a current state of the USB socket is DFP attached and an attachment orientation corresponds to the CC2 pin.

In this way, the USB interface detection chips in the travel charger and the mobile phone both embody detection on the USB interface attachment and attachment orientation.

In this specific example, specific illustration is made by using the travel charger and the mobile phone as an example;

it is obvious that other application scenarios may further be considered, such as a mobile power source and a mobile phone, a travel charger and a computer, and a computer and a USB flash drive. In this specific example, in the DFP mode, the CC1 and CC2 pins are pulled up by using the pull-up current source; and in other examples, the CC1 and CC2 pins may be pulled up by using other manners, for example, by using a pull-up resistor.

In FIG. 4, the attachment/detachment state detections of the USB interface detector in the DFP mode and the UFP mode are described by using the specific example of the travel charger and the mobile phone. It should be noted that, the mode of the USB interface detector is not limited to the two modes, and according to requirements, the mode of the USB interface detector may be set to any one of the following modes: DFP, UFP, DFP+ACC, UFP+ACC, DRP, and DRP+ACC. ACC represents an accessory, for example, in a DFP+ACC mode, not only detection on UFP attachment and detachment of the USB socket can be implemented, but also detection on a debugging accessory and detection on an audio adapter accessory may be implemented. The USB interface detector in the DRP mode switches between the DFP mode and the UFP mode according to a preset task cycle, and in the DFP mode, a pull-up current is provided to detect pull-down of the CC1 and CC2 pins, and in the UFP mode, a pull-down resistor is provided to detect pull-up of the CC1 and CC2 pins. Therefore, in the following descriptions, the DFP+ACC mode and the UFP mode are used as examples to describe basic functions and preferred functions that can be implemented by the USB interface detector according to the embodiments of the present invention.

Figure 5A:
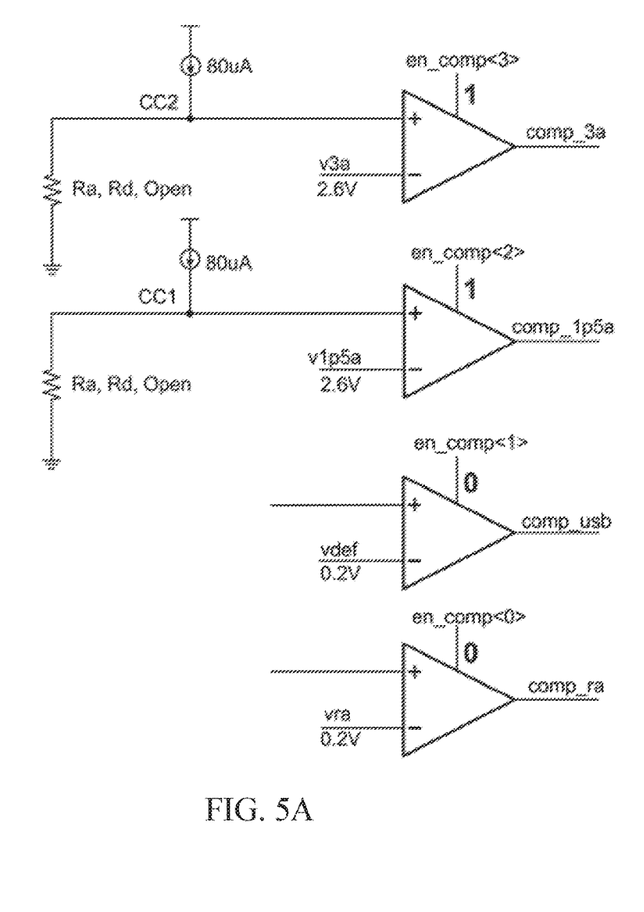
FIGS. 5A-B illustrate example schematic diagrams of a USB interface detector in a DFP+ACC mode.
Figure 5B:
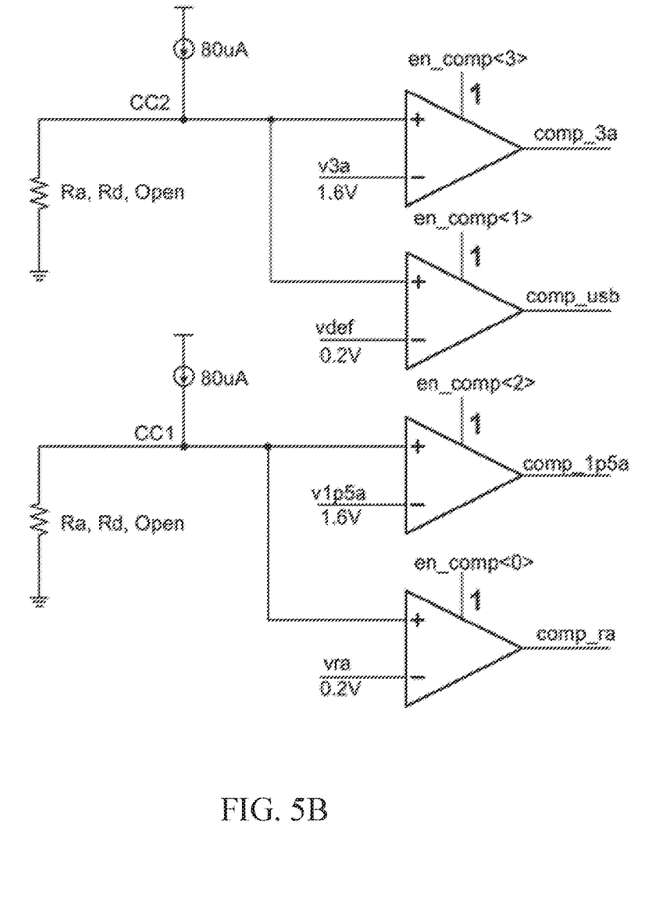

FIGS. 5A-B illustrate example schematic diagrams of a USB interface detector in a DFP+ACC mode. In this embodiments, a comparator circuit comprises four comparators: comp_3a; comp_1p5a; comp_usb; and comp_ra.

FIG. 5A illustrates an example working principle of a USB interface detector in a first phase. In the first phase (that is, an idle/initial phase), the comparators comp_3a and comp_1p5a are enabled, comparison input terminals thereof (positive input terminals shown in the drawing) are respectively connected to CC1 and CC2 pins, and reference input terminals (negative input terminals shown in the drawing) are connected to a first reference voltage. To save the power consumption, the comparators comp_usb and comp_ra are disabled. If the CC1 and CC2 pins are suspended (that is, a USB socket is in a detached state), the comparison input terminals of the comparators comp_3a and comp_1p5a are pulled up to a high level by a pull-up current source, so as to output a logic high level ("1"). When a pull-down resistor Ra or Rd exists at the CC1 and/or CC2 pin, the output terminals of the comparators comp_3a and comp_1p5a are pulled down to a logic low level ("0").

Specifically, if the pull-up current is set to 80 uA, Ra is 1 kΩ, and Rd is 5.1 kΩ, VRa=0.080 V and VRd=0.408 V. If the pull-up current is set to 180 uA, Ra is 1 kΩ, and Rd is 5.1 kΩ, VRa=0.18 V and VRd=0.918 V. If the pull-up current is set to 330 uA, Ra is 1 kΩ, and Rd is 5.1 kΩ, VRa=0.33 V and VRd=1.683 V. Therefore, when the first reference voltage is 2.6 V, and a pull-down resistor Ra or Rd exists at the CC1 and/or CC2 pin, the output terminals of the comparators comp_3a and comp_1p5a are pulled down to a logic low level ("0"). If only the output terminal of the comparator comp_3a is pulled down to the logic low level, it indicates that a CC pin of a USB plug is connected to the CC2 pin of the USB socket, that is, an orientation corresponds to the CC2 pin. If only the output terminal of the comparator comp_1p5a is pulled down to the logic low level, it indicates that the CC pin of the USB plug is connected to the CC1 pin of the USB socket, that is, an orientation corresponds to the CC1 pin. If the output terminals of the comparators comp_3a and comp_1p5a are all pulled down to the logic low level, it indicates that there may be a debugging accessory or an audio adapter accessory inserted, and no orientation is distinguished.

Therefore, the USB interface detector implements detections on the attachment and orientation of the USB plug in the first phase.

After the attachment is detected in the first phase, as shown in FIG. 5b, the USB interface detector enters a second phase in the DFP+ACC mode. In the second phase, all comparators can be enabled, comparison input terminals of the comparators comp_3a and comp_usb are connected to the CC2 pin, and the input terminals of the comparators comp_1p5a and comp_ra are connected to the CC1 pin, and reference voltages V3a, V1p5a, Vdef, and Vra of reference input terminals of the comparators may be set according to the manner show in the following table. It should be noted that, in an actual application, the set of the reference voltage is not limited to voltage values shown in the following table, and the reference voltage values of the comparators may be set according to the value of the pull-up current and pull-down resistance values of CC pins of different connection devices.

TABLE 2

Reference voltages of comparators in a second phase in a DFP + ACC mode

| Pull-Up Current | V3a | V1p5a | Vdef | Vra |
|---|---|---|---|---|
| 80 uA | 1.6 V | 1.6 V | 0.2 V | 0.2 V |
| 180 uA | 1.6 V | 1.6 V | 0.4 V | 0.4 V |
| 330 uA | 2.6 V | 2.6 V | 0.8 V | 0.8 V |

When comp_3a=0, comp_usb=1, comp_1p5a=0, and comp_ra=1, it indicates that the Rd/Rd is connected to the CC1 and CC2 pins, that is, the debugging accessory is attached to the USB socket.

When outputs of all comparators are 0, it indicates that the Ra/Ra is connected to the CC1 and CC2 pins, that is, the audio adapter accessory is attached to the USB socket.

When comp_3a=comp_usb=1, comp_1p5a=0, and comp_ra=1, it indicates that the CC2 pin is in a disconnected state, the Rd is connected to the CC1 pin, that is, the UFP device is attached to the USB socket. In this case, to save the power consumption, the comparators comp_3a and comp_usb directed to the CC2 pin may be disabled (for example, it is set that en_comp<3>=0 and en_comp<1>=0).

Therefore, the USB interface detector in the DFP+ACC mode implements detection of a type of a connection device in the second phase. Moreover, in the second phase, the detector in the DFP+ACC mode set an allowable charging current for a VBUS pin, for a connected device to detect the charging current.

Based on the description on the working principle of the USB interface detector in the DFP+ACC mode, in an embodiment of the present invention, a flow diagram of a USB interface detection method in a DFP+ACC mode is provided.

Figure 6:
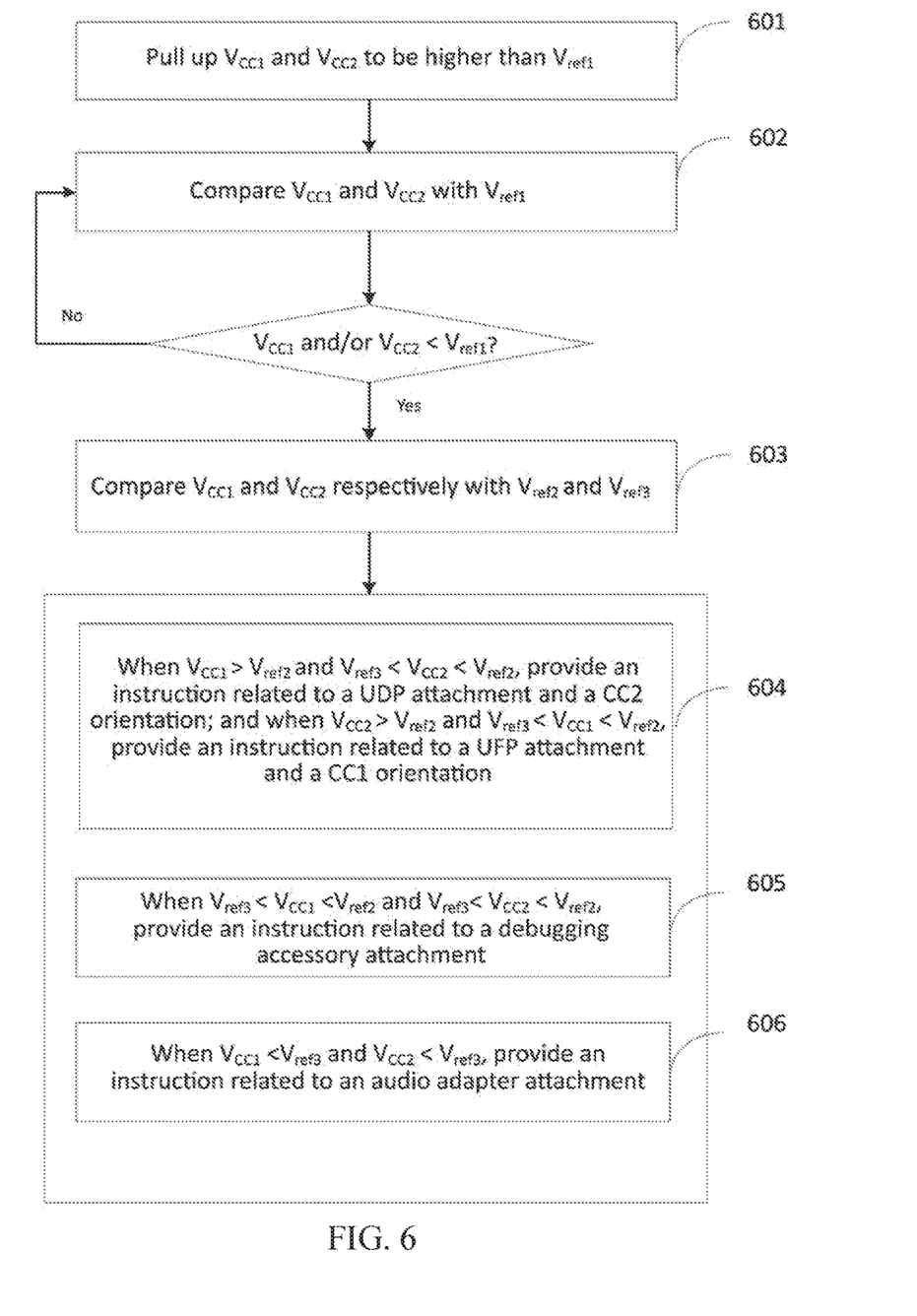
FIG. 6 illustrates an example flow diagram of a USB interface detection method.

FIG. 6 illustrates an example flow diagram of a USB interface detection method 600, which may comprise the following steps:

In step 601, voltages $V_{CC1}$ and $V_{CC2}$ at a first pin and a second pin can be pulled up to be higher than a first reference voltage $V_{ref1}$ (for example, pulled up to a high level). In step 602, the voltages $V_{CC1}$ and $V_{CC2}$ at the first and second pins can be respectively compared with the first reference voltage, so as to detect whether the voltage $V_{CC1}$ or $V_{CC2}$ of at least one of the first and second pins is dropped to be lower than the first reference voltage $V_{ref1}$. In step 603, the voltages $V_{CC1}$ or $V_{CC2}$ at the first and second pins can be respectively compared with a second reference voltage $V_{ref2}$ and a third reference voltage $V_{ref3}$ that are lower than the first reference voltage. In step 604, when the voltage at one of the first and second pins is higher than the second reference voltage $V_{ref2}$ and the voltage at the other pin is lower than the second reference voltage $V_{ref2}$ and higher than the third reference voltage $V_{ref3}$, it can indicate that the Rd is connected to the first or second pin, and an instruction related to UFP attachment and an attachment orientation can be provided. In step 605, when the voltages $V_{CC1}$ or $V_{CC2}$ at the first and second pins are lower than the second reference voltage $V_{ref2}$ and higher than the third reference voltage $V_{ref3}$, it can indicate that the Rd/Rd is connected to the first and second pins, and an instruction related to debugging accessory attachment can be provided. In step 606, when the voltages $V_{CC1}$ or $V_{CC2}$ at the first and second pins are lower than the second reference voltage $V_{ref2}$ and lower than the third reference voltage $V_{ref3}$, it can indicate that the Ra/Ra is connected to the first and second pins, and an instruction related to audio adapter accessory attachment can be provided.

In an example, the first, second, third and fourth comparators may be used at the same time to perform comparisons with the second and third reference voltages, and two of the first, second, third and fourth comparators may be used at the same time to perform comparisons of the voltages at the first and second pins with the first reference voltage. When multiple comparators are used to work in parallel, the detection rate may be improved. When two comparators in the first, second, third and fourth comparators are used, the other two comparators may be disabled to save the power consumption.

Figure 7A:
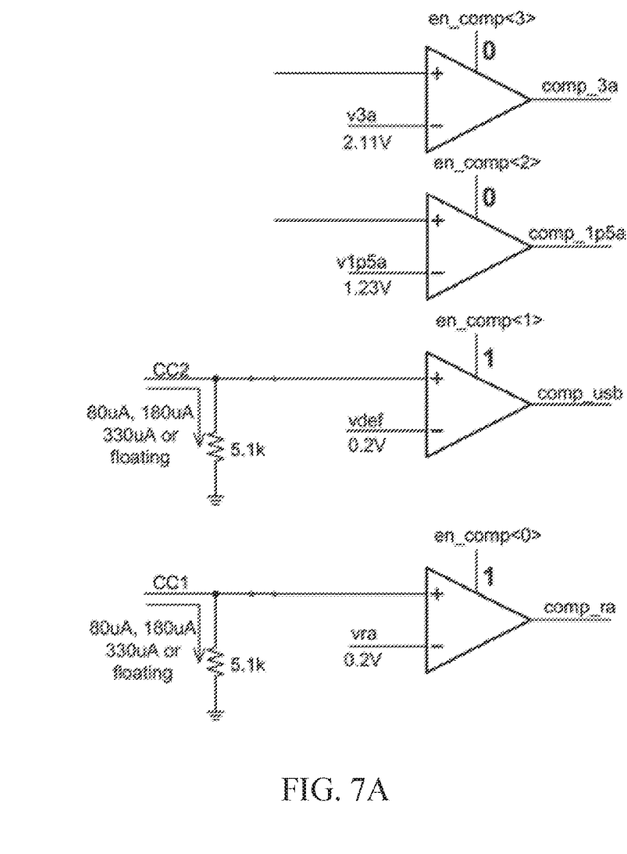
FIGS. 7A-B illustrate example schematic diagrams of a USB interface detector in a UFP mode.
Figure 7B:
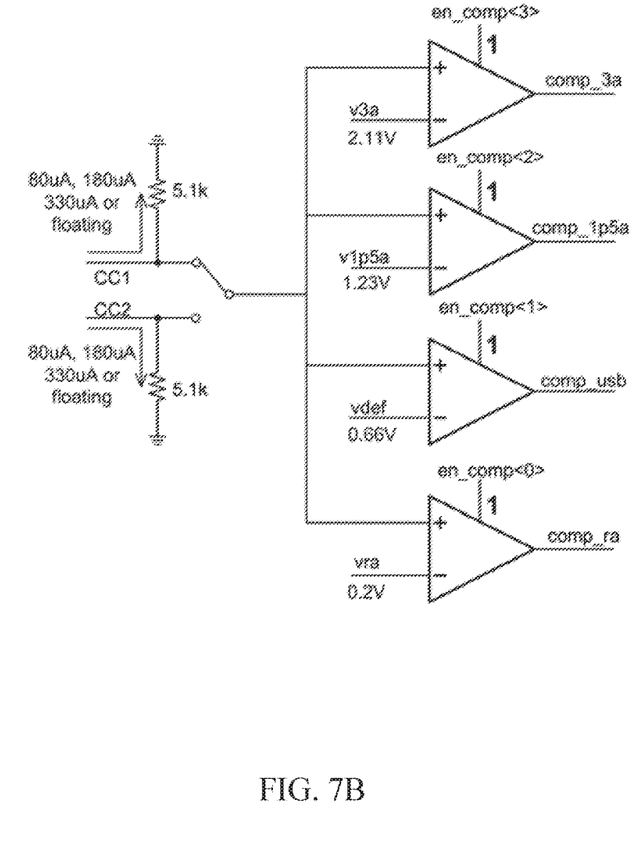

FIGS. 7A-B illustrate example schematic diagrams of a USB interface detector in a UFP mode. In this embodiment, a comparator circuit comprises four comparators comp_3a, comp_1p5a, comp_usb and comp_ra.

FIG. 7A illustrates a working principle of a USB interface detector in a first phase. For example, in the first phase (e.g., an idle/initial phase), the comparators comp_usb and comp_ra can be enabled, comparison input terminals thereof (positive input terminals shown in the drawing) can be respectively connected to CC1 and CC2 pins, and reference input terminals (negative input terminals shown in the drawing) can be connected to a reference voltage. To save the power consumption, the comparators comp_3a and comp_1p5a can be disabled. If the CC1 and CC2 pins are suspended (that is, a USB interface is in a detached state), the comparison input terminals of the comparators comp_usb and comp_ra can be pulled down to a low level by a pull-down resistor, so as to output a logic low level ("0"). When a pull-up current exists at the CC1 and/or CC2 pin, the output terminal of the comparator comp_usb or comp_ra can be pulled up to a logic high level ("1").

Specifically, if the pull-up current is set to 80 uA, and Rd is 5.1 kΩ, VRd=0.408 V. If the pull-up current is set to 180 uA, and Rd is 5.1 kf, VRa=0.18 V and VRd=0.918 V. If the pull-up current is set to 330 uA, and Rd is 5.1 kΩ, VRd=1.683 V. Therefore, when the reference voltage is 0.2 V, and a pull-down resistor Rd exists at the CC1 or CC2 pin, voltage of comparison input terminals of the comparators comp_usb or comp_ra is higher than 0.2 V, so the output terminals thereof are pulled to a logic high level ("1"). If the output terminal of the comparator comp_usb is pulled to the logic high level, it indicates that the CC pin of the USB plug is connected to the CC2 pin of the USB socket, that is, an orientation corresponds to the CC2 pin. If only the output terminal of the comparator comp_ra is pulled to the logic high level, it indicates that the CC pin of the USB plug is connected to the CC1 pin of the USB socket, that is, an orientation corresponds to the CC1 pin.

Therefore, the USB interface detector implements detections on the attachment and orientation of the USB interface in the first phase. In other words, when the USB interface detector detects the attachment in the first phase, it is considered that the USB interface detector detects that there is a current injected into the CC1 pin or CC2 pin in the first phase.

After the attachment is detected in the first phase, as shown in FIG. 7B, the USB interface detector in the UFP mode enters a second phase. In the second phase, all comparators are enabled, and input terminals of all comparators are connected to the CC pin in an attached state. For example, when the output terminal of the comparator comp_usb is pulled to the logic high level in the first phase, in the second phase, comparison input terminals of all comparators are connected to the CC2 pin, and when the output terminal of the comparator comp_ra is pulled to the logic high level in the first phase, in the second phase, comparison input terminals of all comparators are connected to the CC1 pin.

As shown in FIG. 7B, the comparison input terminals of all comparators are connected to the CC1 pin, different reference voltages V3a, V1p5a, Vdef, and Vra are provided to reference input terminals of the comparators, and values of the reference voltages may be set according to the manner shown in the following table. It should be noted that, in an actual application, the set of the reference voltage is not limited to voltage values shown in the following table, and the reference voltage values of the comparators may be set according to the value of the pull-up current and pull-down resistance values of CC pins.

TABLE 3

Correspondence relationship between reference voltage of a comparator of a UFP device and a detected pull-up current

| | V3a | V1p5a | Vdef | Vra |
|---|---|---|---|---|
| | 2.11 V | 1.23 V | 0.66 V | 0.2 V |
| Pull-up current | | 330 uA | 180 uA | 80 uA |

By means of comparison, the magnitude of the provided charging current of the UFP device may be detected. For example, when omp_ra=1, comp_usb=0, comp_1p5a=0, and comp_3a=0, it indicates that the DFP device (Host) provides a pull-up current of 80 uA, and therefore, the DFP device provides a charging current of 900 mA through a VBUS pin. When omp_ra=1, comp_usb=1, comp_1p5a=0, and comp_3a=0, it indicates that the DFP device (Host) provides a pull-up current of 180 uA, and therefore, the DFP device provides a charging current of 1.5 A through a VBUS port. When omp_ra=1, comp_usb=1, comp_1p5a=1, and comp_3a=0, it indicates that the DFP device (Host) provides a pull-up current of 330 uA, and therefore, the DFP device provides a charging current of 3 A through a VBUS port.

Therefore, the USB interface detector implements, in the second phase, detection on the magnitude of the charging current provided by the attached DFP device (host).

Based on the description on the working principle of the USB interface detector in the UFP mode, in an embodiment of the present invention, a flow diagram of a USB interface detection method in a UFP mode is provided.

Figure 8:
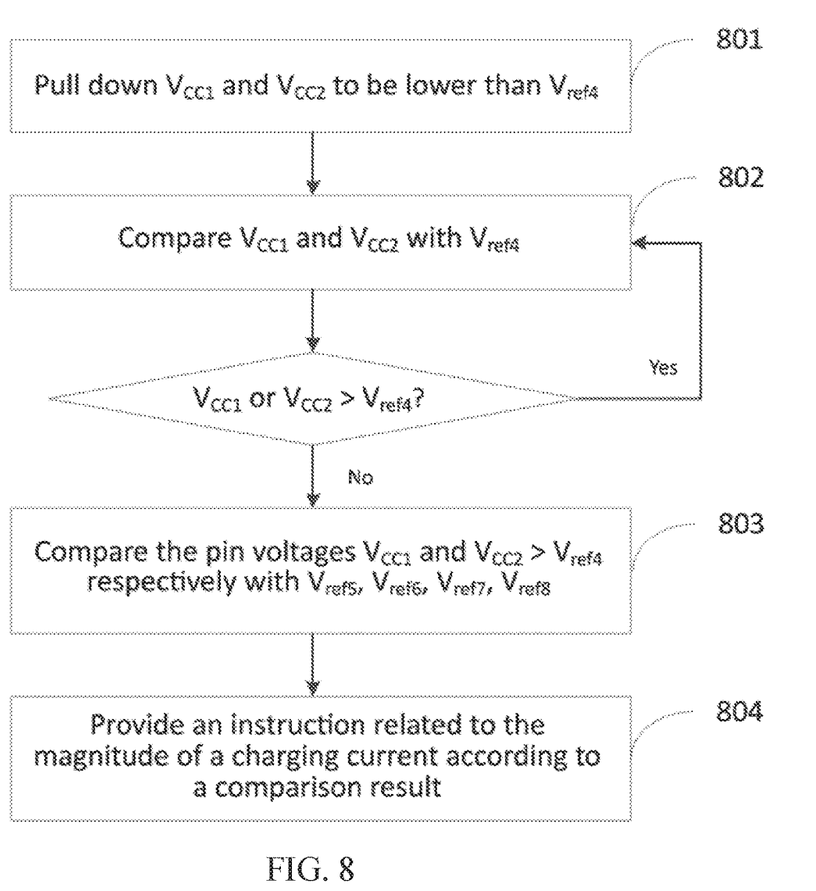
FIG. 8 illustrates an example flow diagram of a USB interface detection method.

FIG. 8 illustrates an example flow diagram of a USB interface detection method 800, which may comprise the following steps:

In step 801, voltages $V_{CC1}$ and $V_{CC2}$ at a first pin and a second pin can be pulled down by using a pull-down resistor to be lower than a fourth reference voltage $V_{ref4}$ (for example, pulled down to a local ground level). In step 802, the voltages $V_{CC1}$ and $V_{CC2}$ at the first and second pins can be respectively compared with the fourth reference voltage $V_{ref4}$, so as to detect whether the voltage $V_{CC1}$ or $V_{CC2}$ at one of the first and second pins is lifted to be higher than the fourth reference voltage $V_{ref4}$. In step 803, when the lift is detected, the lifted voltage $V_{CC1}$ or $V_{CC2}$ can be compared respectively with a fifth reference voltage $V_{ref5}$, a sixth reference voltage $V_{ref6}$, a seventh reference voltage $V_{ref7}$, and an eighth reference voltage $V_{ref8}$ that are higher than the fourth reference voltage $V_{ref4}$. In step 804, an instruction related to the magnitude of a charging current can be provided by the second device to the first device is provided according to results of comparison with the fifth, sixth, seventh, and eighth reference voltages $V_{ref5}$, $V_{ref6}$, $V_{ref7}$, and $V_{ref8}$.

In an example, when the first device is operated as a UFP device, in a first phase, two of the first, second, third, and fourth comparators are used at the same time to perform comparisons of voltages at the first and second pins with the fourth reference voltage, and at the same time, other two comparators are disabled; and in a second phase, the first, second, third, and fourth comparators are used at the same time to perform comparisons with the fourth, fifth, sixth, and seventh reference voltages. When multiple comparators are used to work in parallel, the detection rate may be improved.

As described in the above, except for the DFP+ACC mode and the UFP mode, the USB interface detection method of the USB interface detector in other modes diversifies according to whether the device having the USB interface detector is operated as a DFP or a UFP and whether an ACC mode detection is supported. However, persons skilled in the art may derive that the USB interface detection methods in other modes may be implemented by dividing and combining the detection methods shown in FIG. 6 and FIG. 8 through the SUB interface detector according to the present invention with reference to the working principles of the USB interface detectors shown in FIG. 5 and FIG. 7.

Figure 9:
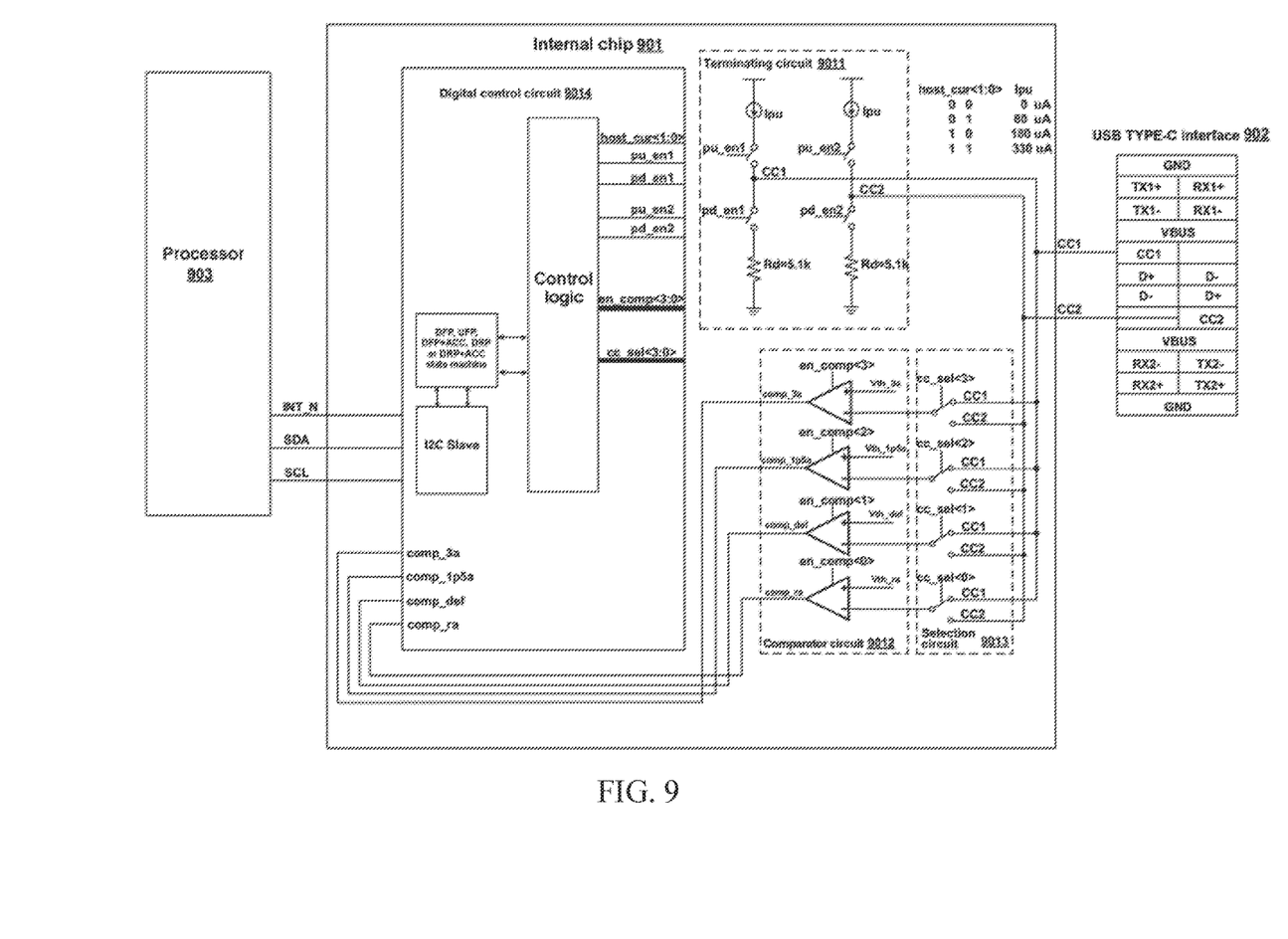
FIG. 9 illustrates an example structural diagram of a USB interface detector.

FIG. 9 illustrates an example structural diagram of a USB interface detector implemented as an internal chip 901 located in a USB socket, which is connected to a USB socket interface 902 and a processor 903. The processor 903 may be a processor of a device having the USB socket, and may also be a processor of an external device. The chip 901 includes a first input terminal CC1 and a second input terminal CC2 respectively connected to CC1 and CC2 pins, I2C bus ports SDA and SCL used to perform communication with the processor 903, an interrupting port INT_N used to output a detection signal, a terminating circuit 9011, a comparator circuit 9012, a selection circuit 9013, and a digital control circuit 9014.

In an example, the digital control circuit 9014 can include a field programmable gate array (FPGA). The digital control circuit 9014 may comprise a register, and a user (for example, a device manufacturer) may program the processor to setting, through the 12C bus, a mode of the chip 901 in the register to be one of DFP, UFP, DRP, DFP+ACC, UFP+ACC, and DRP+ACC modes. In addition, when the device has the possibility of being operated as a DFP (that is, the mode of the chip 901 is DFP, DRP, DFP+ACC or DRP+ACC) or is in the UFP+ACC mode (in the UFP+ACC mode, the mode of the chip switches periodically between pull-up and pull-down, if CC1 and CC2 ends of a load is pull-down Rd/Rd or Ra/Ra, the chip assumes pull-up, and if the load end is DFP, the chip assumes pull-down), a value of a pull-up current may further be set in the register.

In FIG. 9, the value of the pull-up current is indicated by a signal line host_cur<1:0>. When host_cur<1:0>=0 0, it indicates that the pull-up current is 0 uA, that is, no pull-up current is provided currently. When host_cur<1:0>=0 1, it indicates that the pull-up current is 80 uA, that is, the device is a DFP device providing a default charging current. When host_cur<1:0>=1 0, it indicates that the pull-up current is 180 uA, that is, the device is a DFP device providing a 1.5 A charging current. When host_cur<1:0>=1 1, it indicates that the pull-up current is 330 uA, that is, the device is a DFP device providing a 3 A charging current. The signal line host_cur<1:0> may be used to control the magnitude of the pull-up current provided by a pull-up current source in the terminating circuit 9011.

The digital control circuit 9014 may further output switch control signals pu_en1, pu_en2, pd_en1 and pd_en2 to the terminating circuit 9011. When the device is operated as a DFP, the switch control signals control switches in the terminating circuit 9011 to connect the pull-up current source with the input terminals CC1 and CC2 (that is, the CC1 and CC2 pins in the USB socket interface), and disconnect a pull-down resistor Rd with the input terminals CC1 and CC2 (that is, the CC1 and CC2 pins in the USB socket interface). When the device is operated as a UFP, the switch control signals control switches in the terminating circuit 9011 to disconnect the pull-up current source with the input terminals CC1 and CC2 (that is, the CC1 and CC2 pins in the USB socket interface), and connect a pull-down resistor Rd with the input terminals CC1 and CC2 (that is, the CC1 and CC2 pins in the USB socket interface). In this embodiment, the digital control circuit 904 provides four switch control signals, and the terminating circuit 9011 comprises four switches. A person skilled in the art may derive that, in other embodiments, switch control signals and switches of different numbers may be used to implement termination of the CC1 and CC2 pins.

The comparator circuit 9012 comprises four comparators comp_3a, comp_1p5a, comp_usb, and comp_ra that operate in parallel. The digital control circuit 9014 provides an enable control signal en_comp<3:0> to enable or disable each comparator. In the present invention, disabling a part of the comparators in some phases may save the power consumption. In the descriptions of FIG. 5a, FIG. 5b, FIG. 7a, and FIG. 7b, detailed explanations are made to indicate when to enable and disable the comparators, and therefore, they are not repeated herein. Different reference voltages are provided to the reference input terminal of each comparator in different modes in different phases, and reference voltage values used for detection may be obtained with reference to Table 4. Details may be obtained with reference to the descriptions of FIG. 5a, FIG. 5b, FIG. 7a, and FIG. 7b, and are not repeated herein. Each reference voltage may be generated by the digital control circuit 9014 controlling a reference voltage generating circuit (not shown), and are not repeated herein.

TABLE 4

Reference voltages of comparators of various devices

| Operation mode of device | Host_cur 1 | Host_cur 2 | Current | Vra | Vdef | V1p5a | V3a |
| --- | --- | --- | --- | --- | --- | --- | --- |
| UFP-VDD valid | X | X | N/A | 0.2 | 0.66 | 1.23 | 2.11 |
| DFP-default current | 0 | 1 | 80 uA | 0.2 | N/A | N/A | 1.6 |
| DFP-1.5 A current | 1 | 0 | 180 uA | 0.4 | N/A | N/A | 1.6 |
| DFP-3.0 A current | 1 | 1 | 330 uA | 0.8 | N/A | N/A | 2.6 |

The selection circuit 9013 can be used to selectively connect a selection input terminal of each comparator in the comparator circuit 9012 to the first input terminal or the second input terminal (e.g., the CC1 pin or the CC2 pin) according to a selection signal cc_sel<3:0> provided by the digital control circuit 9014, so as to implement comparison of the voltage of the CC1 or CC2 pin with each reference voltage. A specific selective attachment operation may be obtained with reference to the descriptions of FIG. 5*a*, FIG. 5*b*, FIG. 7*a*, and FIG. 7*b*, and are not repeated herein.

Output terminals of the comparators comp_3a, comp_1p5a, comp_usb, and comp_ra are connected to the digital control circuit 9014. In an example, when a result of comparison changes, the digital control circuit 9014 may request the processor 903 for interruption through a port INT_N, so as to output a detection result.

In the several embodiments provided in the present application, it should be understood that, the disclosed device and method may be implemented in other manners. The device embodiment described in the foregoing is merely schematic, for example, the division of units is merely division of logic functions, and in fact, there may be other division manners during implementation, for example, multiple units or components may be combined or may be integrated into another system, or some features may be omitted or may not be executed. In addition, the displayed or discussed coupling or direct coupling or communication connection between the components may be implemented through some interfaces, and indirect coupling or communication connection between devices or units, and may be in the form of electrical, mechanical or other forms.

Units described as separated parts may be or may not be physically separated, parts displayed as units may be or may not be physical units, and they may be located at the same place, or be distributed to multiple network units. A part or all of the units may be selected according to actual requirements to implement the objective of the solution of this embodiment.

In addition, functional units in the embodiments of the present invention may be integrated in a processing module, the units may also be each served as a separate unit, or two or more units are integrated into one unit. The integrated units may be implemented in a form of hardware, and may also be implemented in a form of hardware plus software function units.

Persons of ordinary skill in the art may understand that all or a part of steps of the method embodiment may be implemented by a program instructing related hardware, the program may be stored in a computer readable storage medium, and when the program is executed, the steps of the method embodiment are executed; the storage medium includes various mediums capable of storing program codes, such as a mobile storage device, a Read-Only Memory (ROM), a Random Access Memory (RAM), a magnetic disk, and an optical disc.

The present invention is described through the exemplary embodiments that are currently considered as practical embodiments; however, it should be understood that the present invention is not limited to the disclosed embodiments, and on the contrary, the present invention intends to cover various modifications and equivalent configurations without departing from the spirit and scope of the accompanying claims.

ADDITIONAL NOTES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. If two elements are shown in the drawings with a line connecting them, the two elements can be either be coupled, or directly coupled, unless otherwise indicated. If two elements are coupled, one or more intervening elements may be present. In contrast, in embodiments where an element is referred to as "directly coupled" to another element, there can be no intervening elements in those embodiments.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A universal serial bus (USB) interface detection method, applicable to a USB connector mounted in a first device, the method comprising:
   pulling up a voltage of a first pin and a voltage of a second pin in the USB connector in a downstream facing port (DFP) operation mode to be higher than a first reference voltage using a terminating circuit;
   enabling a first comparator and a second comparator during a first phase, the first phase including:
      comparing the voltage of the first pin with the first reference voltage using the first comparator;
      comparing the voltage of the second pin with the first reference voltage using the second comparator;
   enabling a third comparator and a fourth comparator during a second phase in response to at least one of the voltage of the first pin or the voltage of the second pin being less than the first reference voltage, the second phase including:
      comparing each of the voltage of the first pin and the voltage of the second pin to a second reference voltage and a third reference voltage using the first comparator, the second comparator, the third comparator, and the fourth comparator; and
   providing, at an output terminal, an instruction related to attachment or detachment of the first device with a second device based on an output of the first comparator, an output of the second comparator, an output of the third comparator, and an output of the fourth comparator during the second phase.

2. The method of claim 1, wherein the third reference voltage is lower than the second reference voltage, and the second reference voltage is lower than the first reference voltage.

3. A universal serial bus (USB) interface detector, applicable to a USB connector mounted in a first device, comprising:
   a first detection terminal and a second detection terminal, respectively connected to a first pin and a second pin of the USB connector;
   a terminating circuit configured to pull up a voltage of the first pin and a voltage of the second pin in a downstream facing port (DFP) operation mode and to pull down the voltage of the first pin and the voltage of the second pin in an upstream facing port (UFP) operation mode;
   a comparator circuit including a plurality of comparators operable during a first phase and a second phase, the plurality of comparators including a first comparator, a second comparator, a third comparator, and a fourth comparator, each of the plurality of comparators selectively coupled to either the first pin or the second pin, each of the plurality of comparators being coupled to a different reference voltage, at least one of the plurality of comparators being disabled during the first phase,
   wherein, during the first phase, the first comparator is configured to compare the voltage of the first pin to a first reference voltage, and the second comparator is configured to compare the voltage of the second pin to the first reference voltage,
   wherein, during the second phase, each of the first comparator, the second comparator, the third comparator, and the fourth comparator is configured to compare the voltage of the first pin or the second pin to a different reference voltage;
   a selection circuit configured to selectively couple the first pin or the second pin to each of the plurality of comparators; and
   a digital control circuit coupled to outputs of the plurality of comparators, the digital control circuit configured to receive an instruction based on results of comparisons performed by the plurality of comparators.

4. The USB interface detector of claim 3, wherein the instruction refers to an instruction related to attachment or detachment with a second device.

5. The USB interface detector of claim 3, wherein the comparator circuit is configured to provide, according to comparison results during the second phase, an instruction related to a type of a second device or an instruction related to a magnitude of a provided charging current.

6. The USB interface detector of claim 3, wherein the digital control circuit configured to:
   control the terminating circuit to pull up or pull down the first and second pins according to an operation mode of the first device;
   provide a selection signal to the selection circuit:
   provide a respective enable signal to each of the plurality of comparators during the second phase; and set the respective reference voltage of the plurality of comparators of the comparator circuit.

7. The USB interface detector of claim 3, wherein the terminating circuit is configured to:
provide a pull-up current source for the first and second detection terminals when the first device is in a DFP operation mode; and
connect the first and second detection terminals to a pull-down resistor when the first device is in a UFP operation mode.

8. The method of claim 1, wherein the second phase includes:
comparing the voltage of the first pin to the second reference voltage using the first comparator;
comparing the voltage of the first pin to the third reference voltage using the second comparator;
comparing the voltage of the second pin to the second reference voltage using the third comparator; and
comparing the voltage of the second pin to the third reference voltage using the fourth comparator.

9. The method of claim 1, wherein the providing the instruction includes:
providing an instruction related to attachment of the first device with an upstream facing port (UFP) and a first attachment orientation in response to the voltage of the first pin being greater than the second reference voltage, the voltage of the second pin being greater than the third reference voltage, and the voltage of the second pin being less than the second reference voltage.

10. The method of claim 9, wherein the providing the instruction includes:
providing an instruction related to attachment of the first device with the UFP and a second attachment orientation in response to the voltage of the second pin being greater than the second reference voltage, the voltage of the first pin being greater than the third reference voltage, and the voltage of the first pin being less than the second reference voltage.

11. The method of claim 1, wherein the providing the instruction includes:
providing an instruction related to attachment with a debugging accessory in response to the voltage of the first pin being greater than the third reference voltage but less than the second reference voltage, and the voltage of the second pin being greater than the third reference voltage but less than the second reference voltage.

12. The method of claim 1, wherein the providing the instruction includes:
providing an instruction related to attachment with an audio adapter accessory in response to the voltage of the first pin being less than the third reference voltage, and the voltage of the second pin being less than the third reference voltage.

13. The method of claim 1, wherein the third comparator and the fourth comparator are disabled during the first phase.

14. A universal serial bus (USB) interface detection method, applicable to a USB connector mounted in a first device, the method comprising:
pulling down a voltage of a first pin and a voltage of a second pin in the USB connector in an upstream facing port (UFP) operation mode to be lower than a first reference voltage using a terminating circuit;
enabling a first comparator and a second comparator during a first phase, the first phase including:
comparing the voltage of the first pin with the first reference voltage using the first comparator;
comparing the voltage of the second pin with the first reference voltage using the second comparator;
enabling a third comparator and a fourth comparator during a second phase in response to at least one of the voltage of the first pin or the voltage of the second pin being greater than the first reference voltage, the second phase including;
comparing the voltage of the first pin to each of a plurality of reference voltages using the first comparator, the second comparator, the third comparator, and the fourth comparator; and
providing, at an output terminal, an instruction related to related to a magnitude of a provided charging current based on an output of the first comparator, an output of the second comparator, an output of the third comparator, and an output of the fourth comparator during the second phase.

15. The method of claim 14, wherein the plurality of reference voltages in the second phase include a second reference voltage, a third reference voltage, a fourth reference voltage, and a fifth reference voltage.

16. The method of claim 15, wherein the second phase includes:
comparing the voltage of the first pin to the second reference voltage using the first comparator;
comparing the voltage of the first pin to the third reference voltage using the second comparator;
comparing the voltage of the first pin to the fourth reference voltage using the third comparator; and
comparing the voltage of the first pin to the fifth reference voltage using the fourth comparator.

17. The method of claim 14, wherein the third comparator and the fourth comparator are disabled during the first phase.

* * * * *